United States Patent
Ochi

(10) Patent No.: US 8,746,303 B2
(45) Date of Patent: Jun. 10, 2014

(54) PNEUMATIC TIRE

(75) Inventor: Naoya Ochi, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 333 days.

(21) Appl. No.: 13/201,513

(22) PCT Filed: Jan. 15, 2010

(86) PCT No.: PCT/JP2010/000194
§ 371 (c)(1),
(2), (4) Date: Aug. 15, 2011

(87) PCT Pub. No.: WO2010/092742
PCT Pub. Date: Aug. 19, 2010

(65) Prior Publication Data
US 2011/0297282 A1    Dec. 8, 2011

(30) Foreign Application Priority Data
Feb. 13, 2009    (JP) .................................. 2009-031624

(51) Int. Cl.
*B60C 11/04*    (2006.01)
*B60C 11/11*    (2006.01)

(52) U.S. Cl.
USPC ............. 152/209.15; 152/209.13; 152/209.26

(58) Field of Classification Search
CPC .............. B60C 11/0306; B60C 11/033; B60C 11/0332; B60C 11/032; B60C 11/11; B60C 11/03; B60C 11/04; B60C 2011/03; B60C 2011/0344; B60C 2011/0341; B60C 2011/0346
USPC ........... 152/209.1, 209.2, 209.3, 209.15, 902, 152/209.26, 209.13, 209.18, 209.27
See application file for complete search history.

(56) References Cited

U.S. PATENT DOCUMENTS 1,504,694 A * 8/1924 Litchfield ................ 152/209.22
2,152,883 A * 4/1939 Harrison .................. 152/209.18
(Continued)

FOREIGN PATENT DOCUMENTS

BE    413537 A    2/1936
GB    520231 A    4/1940
(Continued)

OTHER PUBLICATIONS

Chinese Office Action, dated May 30, 2013, issued in corresponding Chinese Patent Application No. 201080016623.8.
(Continued)

*Primary Examiner* — Eric Hug
(74) *Attorney, Agent, or Firm* — Sughrue Mion, PLLC

(57) ABSTRACT

To improve water evacuation property while preventing uneven wear, as well as to significantly improve the on-ice/snow performances by optimizing a tread pattern.
This pneumatic tire has, in at least a part of a tread portion 1, a small block group $G_B$, the small block group including a plurality of small blocks 3 arranged close together. The small block group $G_B$ comprises at least one circumferential main groove positioned 4 including see-through groove portion which linearly extends in the tread circumferential direction and at least one rib-like land portion 6 provided adjacently to the circumferential main groove and forming a groove side face 5 of the circumferential main groove 4 and continuously extending in the circumferential direction. A number density D of the small blocks is set within a range of 0.003 to 0.04 (pieces/mm$^2$), the number density D representing the number of the small blocks per unit of an actual ground contact area of the small block group.

6 Claims, 7 Drawing Sheets

(56) References Cited

U.S. PATENT DOCUMENTS

| | | | |
|---|---|---|---|
| D162,410 S | * | 3/1951 | Hawkinson .................. D12/574 |
| 3,986,545 A | * | 10/1976 | Montagne .................. 152/209.1 |
| 3,998,256 A | * | 12/1976 | Verdier ...................... 152/209.1 |
| 4,798,236 A | * | 1/1989 | Fujiwara .................. 152/209.18 |
| 5,031,680 A | * | 7/1991 | Kajikawa et al. ........ 152/209.18 |
| 5,785,780 A | * | 7/1998 | Ochi ........................ 152/209.18 |

FOREIGN PATENT DOCUMENTS

| | | |
|---|---|---|
| JP | H082215 A | 1/1996 |
| JP | 08-318710 A | 12/1996 |
| JP | 2000-264019 A | 9/2000 |
| JP | 2002-192914 A | 7/2002 |

OTHER PUBLICATIONS

Extended European Search Report, dated May 3, 2013, issued in European Patent Application No. 10741022.7.

International Search Report of PCT/JP2010/000194 dated Mar. 23, 2010.

Chinese Office Action dated Dec. 11, 2013, issued in corresponding Chinese Patent Application No. 201080016623.8.

* cited by examiner

PNEUMATIC TIRE

CROSS REFERENCE TO RELATED APPLICATIONS

This application is a National Stage of International Application No. PCT/JP2010/000194 filed Jan. 15, 2010, claiming priority based on Japanese Patent Application No. 2009-031624, filed Feb. 13, 2009, the contents of all of which are incorporated herein by reference in their entirety.

FIELD OF THE INVENTION

The present invention relates to pneumatic tires having blocks defined by grooves in a tread portion. Particularly, the present invention provides a technique which improves water evacuation property while preventing an uneven wear, along with significantly improving on-ice/snow performances.

DESCRIPTION OF THE RELATED ART

In conventional pneumatic tires, as shown in FIG. 4, it is widely implemented that blocks 103 are defined by longitudinal grooves 101 extending in the tread circumferential direction and lateral grooves 102 extending in the tread width direction, and sipes are formed on the defined blocks 103, in order to improve on-ice performance by enhancing edge effect. In addition, in such the conventional pneumatic tire, under the demand for higher driving, breaking and cornering performances, in view of arranging more sipes 104 on the block 103 and improving the on-ice performance by enlarged ground contact area, the number of block lows is reduced down to 3 to 9 and each block 103 is shaped into the form of oblong which is elongated in the tread circumferential direction as is disclosed in Japanese Patent Application Laid-Open Publication No. 2002-192914.

RELATED ART DOCUMENT

Patent Literature

Patent Literature 1: Japanese Patent Application Laid-Open Publication No. 2002-192914

SUMMARY OF THE INVENTION

Problems to be Solved by the Invention

Disadvantageously, in the conventional pneumatic tire as discussed above, sine each divided block portion 103a defined by the sipes 104 becomes wide and the stiffness of the divided block portion becomes too small Thus, the divided block portion 103a collapses during contacting the ground and the ground contact property is exacerbated. Therefore, it is difficult to obtain sufficient on-ice performance consistent with vehicle performance of recent years. Further, since each block 103 is large, water screen at the central region of the block 103 between ice and tire cannot be sufficiently removed during braking by only means of the sipes 104. From this reason as well, it is difficult to significantly improve the on-ice performance. In addition, although it is beneficial to reduce negative ratio (i.e., ratio of ground contacting surface area to whole ground contacting area including grooves) by increasing the grand contact area of the tread in order to improve the on-ice performance, it is beneficial to increase the negative ratio by increase groove area, thus, these performances are antinomic one another.

Accordingly, the present invention aims at solving the problems described above, and an object thereof is to improve the water evacuation property while preventing uneven wear, as well as to significantly improve the on-ice/snow performances by optimizing a tread pattern.

Means for Solving the Problems

In order to achieve the object described above, the present invention provides a pneumatic tire having a small block group in at least a part of a tread portion, the small block group including a plurality of small blocks arranged close together, the small blocks being independently defined by grooves and queuing up a plurality of block rows extending in a tread circumferential direction, comprising:

at least one circumferential main groove positioned in the small block group, the circumferential main groove including see-through groove portion, the see-through groove portion linearly extending in the tread circumferential direction;

at least one rib-like land portion provided adjacently to the circumferential main groove, the rib-like portion forming a groove side face of the circumferential main groove and continuously extending in the circumferential direction; and a number density D of the small blocks is set within a range of 0.003 to 0.04 (pieces/mm$^2$), the number density D representing the number of the small blocks per unit of an actual ground contact area of the small block group and obtained by a formula: $D=a/\{PL \times w \times (1-N/100)-S\}$, wherein PL (mm) represents a reference pitch length of the small blocks in the small block group, W (mm) represents a width of small the block group, a (pieces) represents the number of the small blocks existing in a reference zone of the small block group, the reference zone is demarcated by the reference pitch length PL and the width W, N (%) represents a negative ratio in the reference zone, and S (mm$^2$) represents a surface area of the rib-like land portion existing in the reference zone.

It should be noted that the term "reference pitch length of the small block" here refers to the minimum unit of a repeating pattern of the small block in a given block row constituting the small block group. For example, in a case where the repeating pattern is defined by one small block and groove defining this small block, the reference pitch length of the small block is obtained by adding the tread circumferential length of the one small block to the tread circumferential length of the one groove being adjacent to this small block in the tread circumferential direction. Further, the term "width of the small block group" refers to the length of the small block group, which is formed by arranging the small blocks so as to be closed to each other, in the tread width direction. For example, if the small block group lies on the entire tread, the width of the small block group refers to a ground contact width of the tread. Further, the term "actual ground contact area" of the small block group refers to a total surface area of all of the small blocks existing in the reference zone of the small block group. In other words, the actual ground contact area refers to an area which is obtained by subtracting the area of the grooves respectively defining the small blocks, the area of the circumferential main groove, and the surface area of the rib-like land portion from the area of the reference zone which is obtained by multiplying the reference pitch length PL by the width W. Further, the term "surface area of the rib-like land portion" refers to total surface areas of the rib-like land portions in the reference zone. It should be noted that the term "small block" here does not include "rib-like land portion" as is clear from aforementioned formula. That is to say, when the number of the small blocks a is counted, the number of the rib-like land portion is counted out. In addition, the actual ground contact area of the small block group does not include the ground contact area (i.e., surface area) of the rib-like land portion.

According the pneumatic tire of the present invention, since small blocks are arranged so as to be closed to each other, it is possible to increase the total edge length of the blocks, whereby improved edge effect can be achieved in comparison with using sipes. Further, each of the surface area of the small blocks is much smaller than the conventional block, it is possible to improve a ground contact property of each block, and it is possible to reduce the distance from the central region to peripheral region of the block to effectively remove the water screen in the central zone of the block. In addition, water in the ground contact area is effectively drained via the circumferential main groove having see-though groove portion. Further, since the land portion being adjacent to the circumferential main groove is in the form of rib, it is possible to secure the sufficient stiffness, whereby it is possible to prevent uneven wear of the small block around the circumferential main groove.

Therefore, according to the pneumatic tire of the present invention, with the aforementioned interaction, excellent ground contact property and edge effect, effective removal of water screen by means of the small block, effective drain of water by means of the circumferential main groove, and prevention of the uneven wear by means of the rib-like land portion can be achieved, whereby it is possible to improve water evacuation property while preventing the uneven wear, along with significantly improve on-ice/snow performances.

It is preferable that the rib-like land portion has narrow grooves, the narrow grooves close when the rib-like land portion contacts the ground.

Further, it is preferable that widths of the narrow grooves are within a range of 0.2 mm to 2.0 mm.

Further, it is preferable that a side wall adjacent to the circumferential main groove linearly extends in the tread circumferential direction.

Effect of the Invention

According to the pneumatic tire of the present invention, it is possible to improve the water evacuation property while preventing uneven wear, as well as to significantly improve the on-ice/snow performances by optimizing a tread pattern.

BEST MODE FOR IMPLEMENTING THE INVENTION

Figure 1:
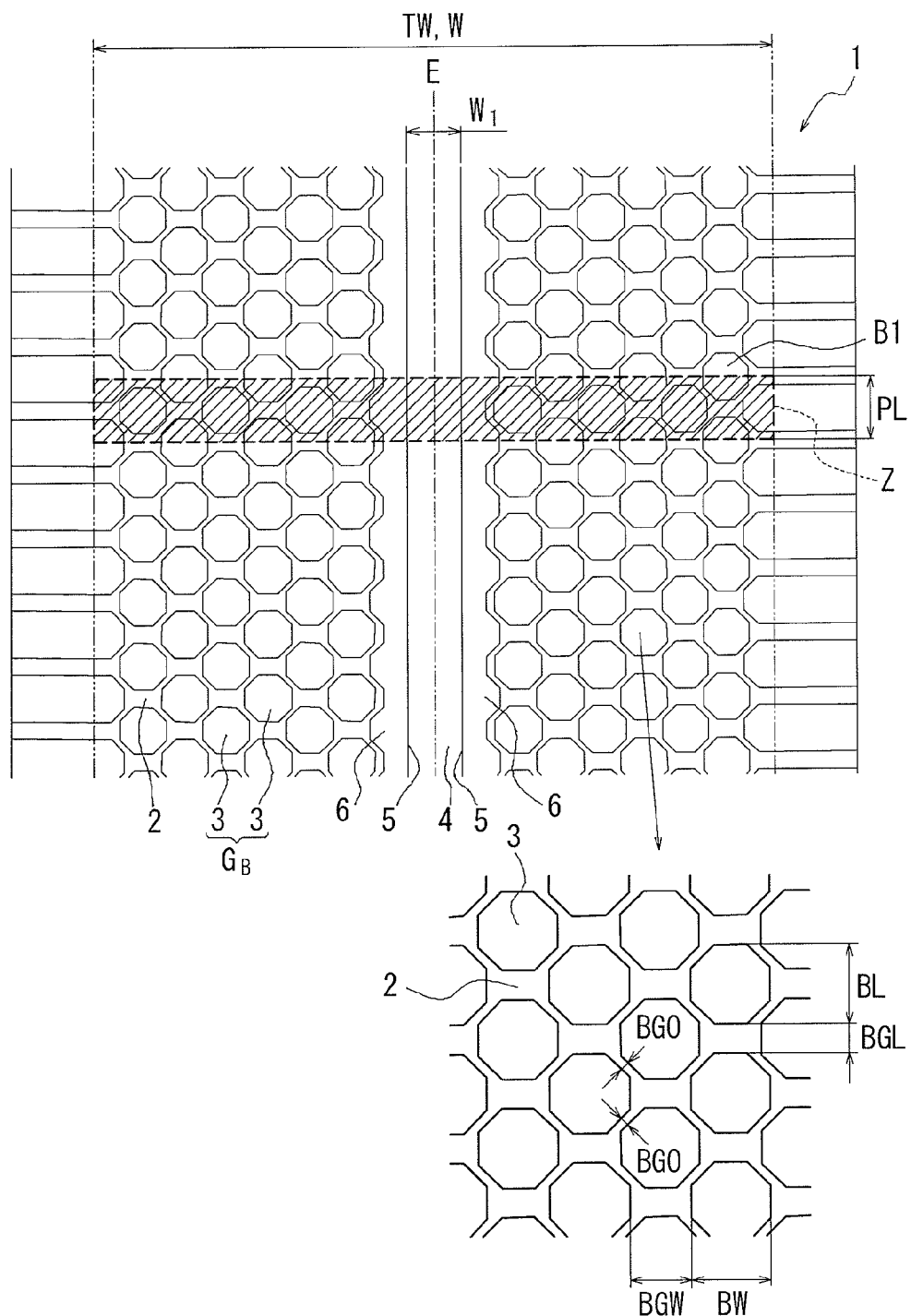
FIG. 1 is a partial development view showing a tread pattern of a pneumatic tire (tire of Example 1) according to an embodiment of the present invention.

Embodiments of the present invention will be described with reference to the drawings hereinafter. FIG. 1 is a partial development view showing a tread pattern of a pneumatic tire (hereinafter, referred to as "tire") according to an embodiment of the present invention. Note that, in the drawing, a vertical direction represents a tread circumferential direction, and a horizontal direction (direction perpendicular to an equatorial plane E) represents a tread width direction.

The tire according to this embodiment has, although not shown in the drawing, a conventional tire structure which includes a carcass toroidally extending between a pair of right and left bead cores, a belt disposed radially outside of a crown portion of said carcass, and a tread portion disposed radially outside of the belt The tire has a tread pattern illustrated in FIG. 1 on the tread portion.

As shown in FIG. 1, this tire has a small block group $G_B$ in the tread portion 1, which is formed by arranging a plurality of small blocks 3 independently defined by grooves 2 close together. In the present embodiment, the block group $G_B$ exists in the entire tread portion 1. Each small blocks is arranged in zigzag alignment with respect to the tread circumferential direction.

It is preferable that the outer shape of the surface of each of the small blocks 3 is a polygon, and it is an octagon in this example. That is, the small block 3 is a column block which has a constant transverse section of octagon. It is preferable that the height of the small block 3 is in a range of 60 to 100% of the groove depth of after-mentioned circumferential main groove 4, and more preferably in a range of 70 to 90% of the groove depth of the circumferential main groove 4.

Figure 4:
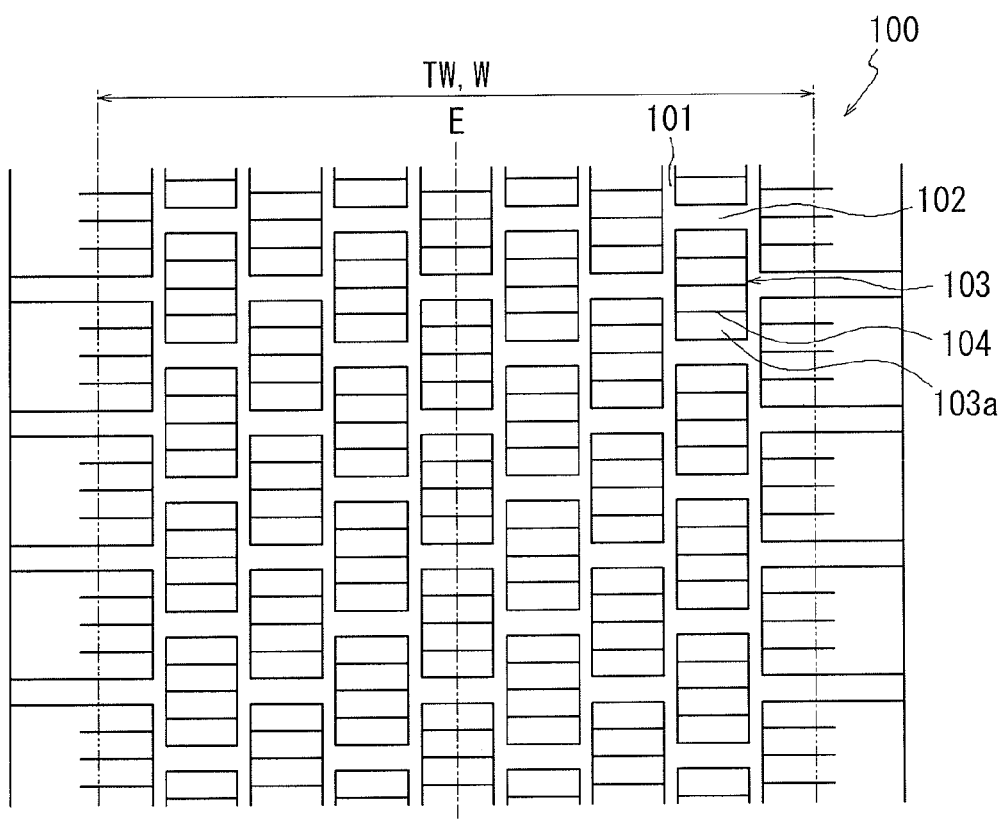
FIG. 4 is a partial development view showing a tread pattern of a conventional pneumatic tire (tire of Conventional Example 1).

The size of the each of the small blocks 3 is smaller than that of the conventional tread pattern as shown in FIG. 4, and the density of the small blocks 3 is higher than that of the conventional tread pattern as shown in FIG. 4. The smaller the size of each of the small block 3 is and the higher the density of the small blocks 3 is, the more edge effect and water evacuation property can be obtained, and preferred range thereof is as below. That is, a number density D of the small blocks (pieces/mm$^2$) refers to the number of the small blocks per unit of an actual ground contact area of the small block group $G_B$ and is represented by a formula:

$$D = \frac{a}{PL \times W \times (1 - N/100) - S} \quad \text{[Formula 1]}$$

is set within a range of 0.003 to 0.04 (pieces/mm$^2$), wherein PL (mm) represents a reference pitch length of the small blocks 3 in the small block group $G_B$, W (mm) represents a width of small the block group $G_B$ (equal to a tread ground contact width TW because the blocks 3 are arranged in the entire tread portion 1 in the present embodiment), a (pieces) represents the number of the small blocks 3 existing in a reference zone Z (hatched area in the drawing) of the small block group $G_B$, which is demarcated by the reference pitch length PL and the width W, N (%) represents a negative ratio in the reference zone Z, and S (mm$^2$) represents surface area of the rib-like land portion existing in the reference zone. The number density D represents how many small blocks 3 exist in the unit area (mm$^2$) of the portion which the small blocks are provided, as density. The actual ground contact area is area that rib-like land portion and grooves are excluded. Just for reference, in the conventional winter tire, the density D is below about 0.002. It should be noted that, at the time of counting the number "a" of the small blocks 3 existing in the reference zone Z of the small block group $G_B$, in a case where certain small block 3 extends across the both inside and outside of the reference zone Z of the small block group $G_B$ and cannot be counted as one block, the number of the small block 3 is counted as a proportion of the remaining area of the small block 3 in the reference zone to the surface area of this small block 3. For example, as is the case for the block indicated by a reference character B1 in FIG. 1, the block which extends across both inside and outside of the reference zone Z and only a half portion of which exists in the reference zone Z, can be counted as ½ piece.

In a case where the number density D of the small blocks 3 in the small block group $G_B$ is less than 0.003 (piece/mm$^2$), it is difficult to obtain high edge effect without forming the sipes. In a case where the number density D of the small blocks 3 more than 0.04 (piece/mm$^2$), the each small block 3 becomes too small to achieve desired block rigidity. In addition, in a case where the number density D of the small blocks 3 in the small block group $G_B$ is in the range of 0.0035 to 0.03 piece/mm$^2$, it is possible to satisfy both of the stiffness of the small block 3 and the edge effect at higher performance.

Further, the tire has at least one (one in the present embodiment) circumferential main groove 4 provided in the small block group $G_B$ and comprising a see-through groove portion which linearly extends in the tread circumferential direction. The circumferential main groove 4 is positioned in the tread central portion (the equatorial plane position). The circumferential main groove 4 extends in the small block group $G_B$. In the present embodiment, since the small block groove $G_B$ is provided in the whole of the tread portion 1, the circumferential main groove 4 extends in whole circumference.

In addition, the tire has a pair of rib-like land portion 6 which are provided adjacently to at least one side (both side in the present embodiment) of the circumferential main groove 4 to form at least one of groove faces (both groove faces in the present embodiment) of the circumferential main groove 4 and continuously extend in the circumferential direction. Side wall (i.e., groove face 5) of the rib-like land portion 6, which is adjacent to the circumferential main groove 4, linearly extents in the circumferential direction. Thus, the groove width $W_1$ is constant in the region where the small block group $G_B$ is provided and the groove width $W_1$ same as the groove width of the see-through groove portion.

According to the tire of the present embodiment, by arranging the small blocks 3 close together, the ground contact property of the tread is improved and particularly the braking and tracking performances of the tread are improved. In the conventional tire, although on-ice performance is improved by providing a number of sipes on a relatively large block, the improvement of the on-ice performance is limited by this technique, because the divided block portions between the sipes collapses during contacting the ground and uniform ground contact of the block is difficult. Compared to this, according to the present invention, since a number of the small blocks 3 are provided close together so that the number density D of the small blocks is within the predetermined range, higher edge effect can be obtained than winter tire having sipes.

Further, in the conventional configuration having sipes on the relatively large block, it is difficult to remove water screen on the ice surface portion corresponding to the block surface central region. Compared to this, according to the present invention, since the block surface area of the small block 3 is small, the distance from the central region to the peripheral region of the block surface is small, whereby it is possible to effectively remove the water screen.

While it is possible to dramatically improve on-ice performance by arranging the small blocks close together and extensive increasing the real ground contact area, like this configuration leads to the tread surface being that of smooth tire. Thus, it is difficult to improve water evacuation property on wet road. In response, in the present invention, since the circumferential main groove 4 including the see-through groove portion which linearly extends in the tread circumferential direction is provided in the small block group $G_B$, it is possible to effectively evacuate water in ground contact surface via the circumferential main groove 4. This provides further improvement of the on-ice performance by synergistic effect with the small blocks 3. In addition, the circumferential main groove 4 improves various aspects of the on-snow performance, particularly cornering performance on ice and snow load because of enhancement of an edge effect in a side direction. The groove width $W_1$ can be change according to the targeted water evacuation performance or the like.

However, in a case where the circumferential main groove 4 is provided to improve the water evacuation performance, the small blocks 3 located around (side of) the circumferential main groove 4 have to be burden load, the load should have been burdened by small blocks which should have been provided instead of the circumferential main groove. Thus, uneven wear to the small blocks 3 increases by the load concentration. In response, in the present invention, the land portion adjacent to the circumferential main groove 4 is made to rib-like shape to secure the stiffness of this land portion, whereby it is possible to prevent the uneven wear.

Therefore, according to the pneumatic tire of the present embodiment, with the aforementioned interaction, excellent ground contact property and edge effect, effective removal of water screen by means of the small block 3 which are arranged close together, effective drain of water by means of the circumferential main groove 4, and prevention of the uneven wear by means of the rib-like land portion 6 can be achieved, whereby it is possible to improve water evacuation property while preventing an uneven wear, along with significantly improve on-ice/snow performances.

Although the rib-like portion 6 can provide aforementioned effect in a case where the rib-like portion 6 is provided at only one side of the circumferential main groove 4, it is preferable that, in a case where on-ice performance and wet performance are important, the number of the rib-like land portion 4 is reduced while small blocks 3 which are surrounded groove 2 are provided as alternated. On the other hand, in a case where uneven wear resistance is important, it is preferable that the rib-like land portions 4 are provided on both side of the circumferential main groove 4. In addition, the rib-like shaped land portion, adjacent to the circumferential main groove 4, smoothes the flow of the discharged water flowing through the circumferential main groove 4 and whereby furthermore improving the water evacuation performance, and also increases the stiffness of the blocks around the circumferential main groove 4 and whereby improving handling performance on dry and wet road.

Further, according to the tire of the present embodiment, the side wall (the groove side face 5 of the circumferential main groove 4) of the rib-like land portion 6 linearly extends in the tread circumferential direction, whereby all parts of the circumferential main groove 4 act as the see-through groove portion and the water evacuation performance by the circumferential main groove 4 can be more improved.

Further, according to the tire of the present embodiment, the small blocks 3 are arranged in the zigzag alignment, whereby more small blocks 3 can be formed and the edges thereof are sequentially made function at the time when the tire is rotated, whereby it is possible to achieve the further excellent edge effect. In addition, the small blocks 3 are arranged in the zigzag alignment, whereby ground contact timing between the blocks 3 adjacent to each other in the tread width direction contact the road can be varied and it is possible to reduce pattern noise. Yet further, by arranging the small blocks 3 in the zigzag alignment as described above, it is possible to easily realize the high density arrangement of the small blocks 3. Moreover, in a case where the small blocks 3 are arranged in zigzag alignment and the number density D of the small blocks is high, the adjacent small blocks 3 support each other when high load is applied to the small blocks 3, whereby it is possible to further improve the stiffness of the small blocks 3 and improve the on-ice performance.

Figure 2:
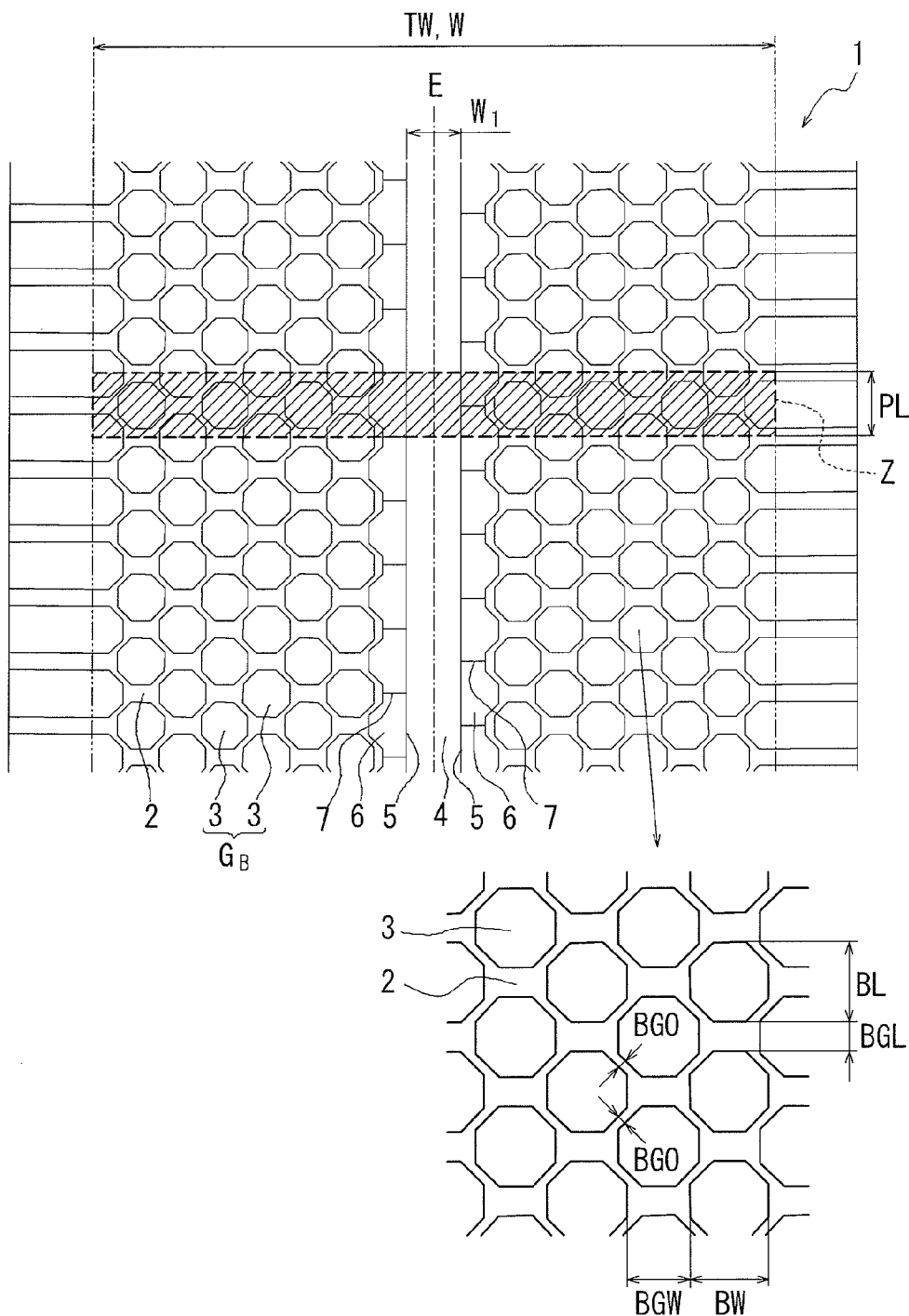
FIG. 2 is a partial development view showing a tread pattern of a pneumatic tire (tire of Example 2) according to another embodiment of the present invention.

Next, other embodiment of the present invention will be described. FIG. 2 is a partial development view showing a tread pattern of a pneumatic tire according to another embodiment of the present invention.

As shown in FIG. 2, this tire has a small block group $G_B$ in the tread portion 1, which is formed by arranging a plurality of small blocks 3 independently defined by grooves 2 close together. The small block group $G_B$ exists in the entire tread portion 1. Each of the small blocks is arranged in zigzag alignment with respect to the tread circumferential direction. The outer shape of the surface of each of the small blocks 3 is an octagon. That is, the small block 3 is a column block which has a constant transverse section of octagon. The number density D of the small blocks is within a range of 0.003 to 0.04 (piece/mm$^2$).

Further, at least one (one in the present embodiment) circumferential main groove 4, which includes see-through groove portion linearly extending in the tread circumferential direction, is provided in the small block group $G_B$. A pair of rib-like land portion 6, which are adjacent to at least one side (both side in the present embodiment) of the circumferential main groove 4 to form at least one of groove side faces (both groove faces in the present embodiment) of the circumferential main groove 4 and continuously extend in the circumferential direction, are provided. A side wall (i.e., groove face 5) of the rib-like land portion 6, which is adjacent to the circumferential main groove 4, linearly extents in the circumferential direction. Thus, the groove width $W_1$ is constant in the region where the small block group $G_B$ is provided and the groove width $W_1$ is the same as the groove width of the see-through groove portion.

In the present embodiment, sipes 7, which open to the tread surface in non-ground contact situation and can close in ground contact and tire rotating situation, are provided as narrow grooves. Any shape of sipes 7 may be used as long as being able to close in the situation where the tire is assemble to a proper rim, tire is inflated at a proper pressure, the tire is loaded with proper load, and tire is rotating.

Here, the aforementioned "proper rim" refers to a rim defined by predetermined standard with respect to each tire, and for example, "Standard Rim" of JATMA, "Design Rim" of TRA, or "Measuring Rim" of ETRTO. The aforementioned "proper pressure" refers to a pressure defined by the aforementioned standards with respect to each tire, and for example, "Maximum pressure" of JATMA, a maximum value described in "TIRE LOAD LIMITS AT VARIOUS COLD INFLATION PRESSURES", or "INFLATION PRESSURE" of ETRTO. The aforementioned "proper load" refers to a road defined by the aforementioned standards with respect to each tire, and for example, Maximum load capacity of JATMA, a maximum value described in "TIRE LOAD LIMITS AT VARIOUS COLD INFLATION PRESSURES", of "LOAD CAPACITY" of ETRTO.

According to the present embodiment, reduction of the small blocks 3 (that is, reduction of edges) caused by the provision of the circumferential main groove 4 and rib-like land portion 6 can be supplemented by the sipes 7, whereby on-ice/snow performances, water evacuation performance, and anti-uneven wear performance can be improved at the high level. Note that, in the present invention, it is preferable that the groove width of the sipe 7 provided on the rib-like land portion 6 is within a range of 0.2 mm to 2.0 mm. This is because in a case where the groove width of the sipe 7 is less than 0.2 mm, the edge effect can be not enough, while in a case more than 2.0 mm, the stiffness of the rib-like land portion is reduced, whereby it become difficult to sufficiently prevent the uneven wear.

Figure 3:
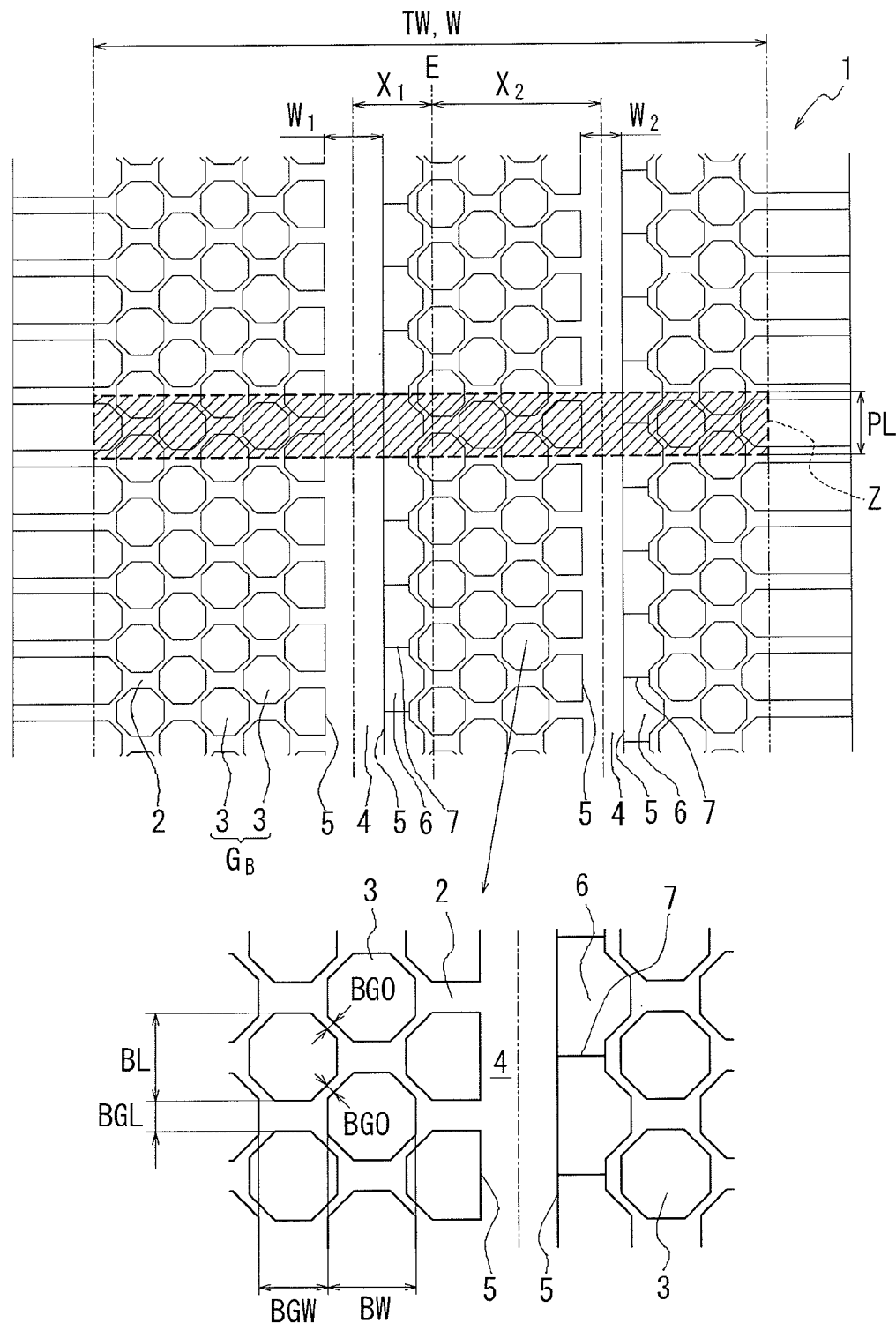
FIG. 3 is a partial development view showing a tread pattern of a pneumatic tire (tire of Example 3) according to another embodiment of the present invention.

Next, yet another embodiment of the present invention will be described. FIG. 3 is a partial development view showing a tread pattern of a pneumatic tire according to another embodiment of the present invention.

As shown in FIG. 3, this tire has a small block group $G_B$ in the tread portion 1, which is formed by arranging a plurality of small blocks 3 independently defined by grooves 2 close together. The small block group $G_B$ exists in the entire tread portion 1. Each of the small blocks is arranged in zigzag alignment with respect to the tread circumferential direction. The outer shape of the surface of each of the small blocks 3 is an octagon. That is, the small block 3 is a column block which has a constant transverse section of octagon. The number density D of the small blocks is within a range of 0.003 to 0.04 (piece/mm$^2$).

Further, two circumferential main grooves 4, each includes see-through groove portion linearly extending in the tread circumferential direction, are provided in the small block group $G_B$. While the circumferential main grooves 4 are disposed both sides of the tire equator E, these circumferential main grooves 4 are asymmetric one another with respect to the tire equator E. That is, distance $X_1$ of the circumferential main groove 4 on the observers' left from the equator in the drawing is smaller that distance $X_2$ of the circumferential main groove 4 on the observers' right from the equator. Further, while the groove side wall 5 of each of the circumferential main grooves 4 is made up of only a straight part, each groove width are different from each other. That is, the groove width $W_1$ of the circumferential main groove 4 on the left is wider than the groove width $W_2$ of the circumferential main groove 4 on the right. Thus, the tread pattern as shown in FIG. 4 is asymmetric pattern.

Further, rib-like land portions 6 are provided in the small block group $G_B$, each rib-like portion 6 is adjacent to the one side of each circumferential main groove 4 and continuously extends in the tread circumferential direction with forming one groove side wall 5 of each circumferential main groove 4. Sipes are provided on the each rib-like land portion 6 as is the case with the embodiment tire as shown in FIG. 2.

According to the tire of the present embodiment, by increasing the number of the circumferential main grooves 4, scratching effect thereof in the lateral direction (tread width direction) can be increased, whereby cornering performance on ice/snow can be further improved. Further, the places (the circumferential main grooves 4) where the small blocks 3 are not provided are dispersed, whereby uniform ground contact property can be obtained and this is better for the on-ice/snow performances. In addition, by disposing the circumferential main grooves 4 in left-right asymmetric placement, the circumferential main grooves 4 can be disposed at best position for the water evacuation performance and the cornering performance on snow, whereby it is possible to effectively improve the both performances. For example, in view of negative camber of axis or the like, if the groove width of the circumferential main groove 4 located inner side of tread center in axis direction is increased (see FIG. 3), the water evacuation performance can be improved.

The more the width of the circumferential main groove 4 is increased, the better the water evacuation is. However, if the number of wide-width circumferential main grooves 4 is increased, there is a possibility of high-frequency tire noise. Because of this, it is preferable that the wide-width circumferential main groove 4 is disposed at the best place for the water evacuation performance and groove width of other circumferential main grooves 4 are small in view of preventing from the high-frequency tire noise.

Although the present invention is described by reference to the embodiments, in the present invention, it is preferable that the negative ratio N in the small block group $G_B$ is within a range of 5% to 50%. In a case where the negative ratio N is less than 5%, groove areas become too small to obtain sufficient water evacuation performance, and each small block becomes too large to realize targeted edge effect of present invention. On the other hand, in a case where the negative ratio N is more than 50%, the ground contact area becomes too small to obtain sufficient driving stability as well as to realize targeted on-ice performance.

The foregoing descriptions merely show a part of embodiments of the present invention, and the structures described above may be combined with each other and/or various modifications may be added thereto unless such combinations/modifications digress from the spirit of the present invention. For example, in the present invention, the outer surface shape of the small blocks 3 is not limited to octagon and round shape, oval shape, other polygonal shape, or irregular closed shape can be acceptable. Further, the circumferential main groove 4 is not limited unless including the see-through groove portion which linearly extends in the tread circumferential direction. For example, the circumferential main groove 4 can curve such as wave. Yet further, the rib-like land portion 6 is not limited unless continuously extending in the tread circumferential direction, and can extents in zigzag or wave pattern. In addition, although it is more effective if the small block group extends over all the tread, the small block group can be provided to a limited extent.

EXAMPLE

Next, tires of Examples 1 to 3 according to the present invention, a tire of Conventional Example 1 according to the conventional technique, and tires of Comparative Examples 1 to 3 are prepared, and performance evaluations regarding on-ice/snow performance, water evacuation performance and anti-uneven wear performance is made on these tires and will be described below.

The tire of Example 1 is a radial tire for passenger vehicle. The tire has a tread pattern illustrated in FIG. 1 on the tread portion and the size of the tire is 205/55R16. This tire has, in the entire tread portion, a small block group comprising a plurality of small blocks which are defined by grooves and arranged so as to be close each other. The tire of Example 1 has, in the small block group, one circumferential main groove comprising a see-through groove portion which linearly extends in tread circumferential direction. The groove width $W_1$ of the circumferential main groove is the same as the groove width of the see-through groove portion and 14 mm. The groove depth of the circumferential main groove is 8.3 mm. Rib-like land portions are respectively provided on the both sides of the circumferential main groove, each rib-like land portion continuously extends in the tread circumferential direction and forms the groove side wall of the circumferential main groove. The width of the rib-like land portion, which is obtained by measuring each rib-like land portion in the tread width direction, is 7.6 mm at minimum, and 11.5 mm at maximum. Other specification of the tire of Example 1 is shown in Table 1.

The tire of Example 2 is a radial tire for passenger vehicle. The tire has a tread pattern illustrated in FIG. 2 on the tread portion and the size of the tire is 205/55R16. In this tire of Example 2 is the same as the tire of Example 1 except sipes linearly extending in the tread width direction provided on the rib-like land portion, the width of each sipe is 0.5 mm, the depth of the each sipe is 4.5 mm. Other specification of the tire of Example 2 is shown in Table 1.

The tire of Example 3 is a radial tire for passenger vehicle. The tire has a tread pattern illustrated in FIG. 3 on the tread portion and the size of the tire is 205/55R16. The tire of Example 3 has two circumferential main grooves which include see-through groove portions respectively, each see-through groove portion linearly extends in the tread circumferential direction. The distances of these circumferential main grooves from the tire equator are different with each other, and the groove widths of these circumferential main grooves are also different with each other. In the tire applied to a vehicle, in the circumferential main groove close to the vehicle (i.e., the circumferential main groove on the observers' left in the drawing), the distance $X_1$ of from the tire equator to the center line of the circumferential main groove is 21.9 mm. In the circumferential main groove away from the vehicle (i.e., the circumferential main groove on the observers' right in the drawing), the distance $X_2$ of from the tire equator to the center line of the circumferential main groove is 48.0 mm. The groove width $W_1$ of the left circumferential main groove is the same as the groove width of the see-through groove portion and is 16.5 mm. The groove width $W_2$ of the right circumferential main groove is the same as the groove width of the see-through groove portion and is 11 mm. Rib-like land portion is provided on one side (which is far from the vehicle) of each circumferential main groove, each rib-like land portion forms on of groove faces of the circumferential main groove and continuously extends in the tread circumferential main groove. The width of each rib-like land portion, which is obtained by measuring the rib-like land portion in the tread width direction, is 7.6 mm at minimum, 11.5 mm at maximum. Other specification of the tire of Example 3 is shown in FIG. 1.

Figure 5:
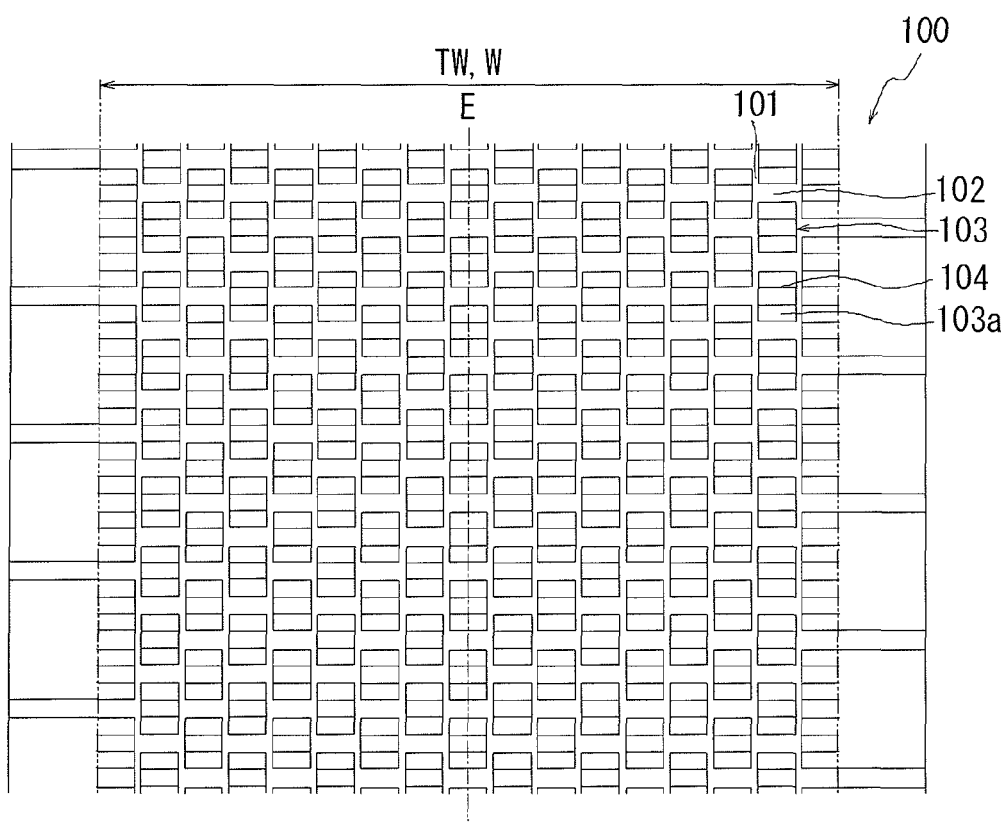
FIG. 5 is a partial development view showing a tread pattern of a comparative pneumatic tire (tire of Comparative Example 1).

For the sake of comparison, the tire of Conventional Example 1 and the tire Comparative Example 1 are also prepared, the tire Conventional Example 1 is a radial tire in 205/55R16 size and has a tread pattern which a negative ratio of the whole of the tread portion is 31.9% as shown in FIG. 4, the tire Comparative Example 1 is a radial tire in 205/55R16 size and has a tread pattern which a negative ratio of the whole of the tread portion is 32.6% as shown in FIG. 5. The tire Conventional Example 1 has, in the tread portion, a plurality of rectangle blocks which are defined by longitudinal grooves extending in the tread circumferential main groove and lateral grooves intersecting at right angle with the longitudinal grooves. The width of the longitudinal groove is 3 mm and the depth of the longitudinal groove is 8.5 mm. The width of the lateral groove is 7.9 mm and the depth of the lateral groove is 8.5 mm. In addition, three straight sipes are provided on each block. The tire Comparative Example 1 has, in the tread portion, a plurality of rectangle blocks which are defined by longitudinal grooves extending in the tread circumferential main groove and lateral grooves intersecting at right angle with the longitudinal grooves. The width of the longitudinal groove is 1.2 mm and the depth of the longitudinal groove is 8.5 mm. The width of the lateral groove is 4.5 mm and the depth of the lateral groove is 8.5 mm. In addition, two straight sipes are provided on each block. Other specifications are shown in Table 1.

Figure 6:
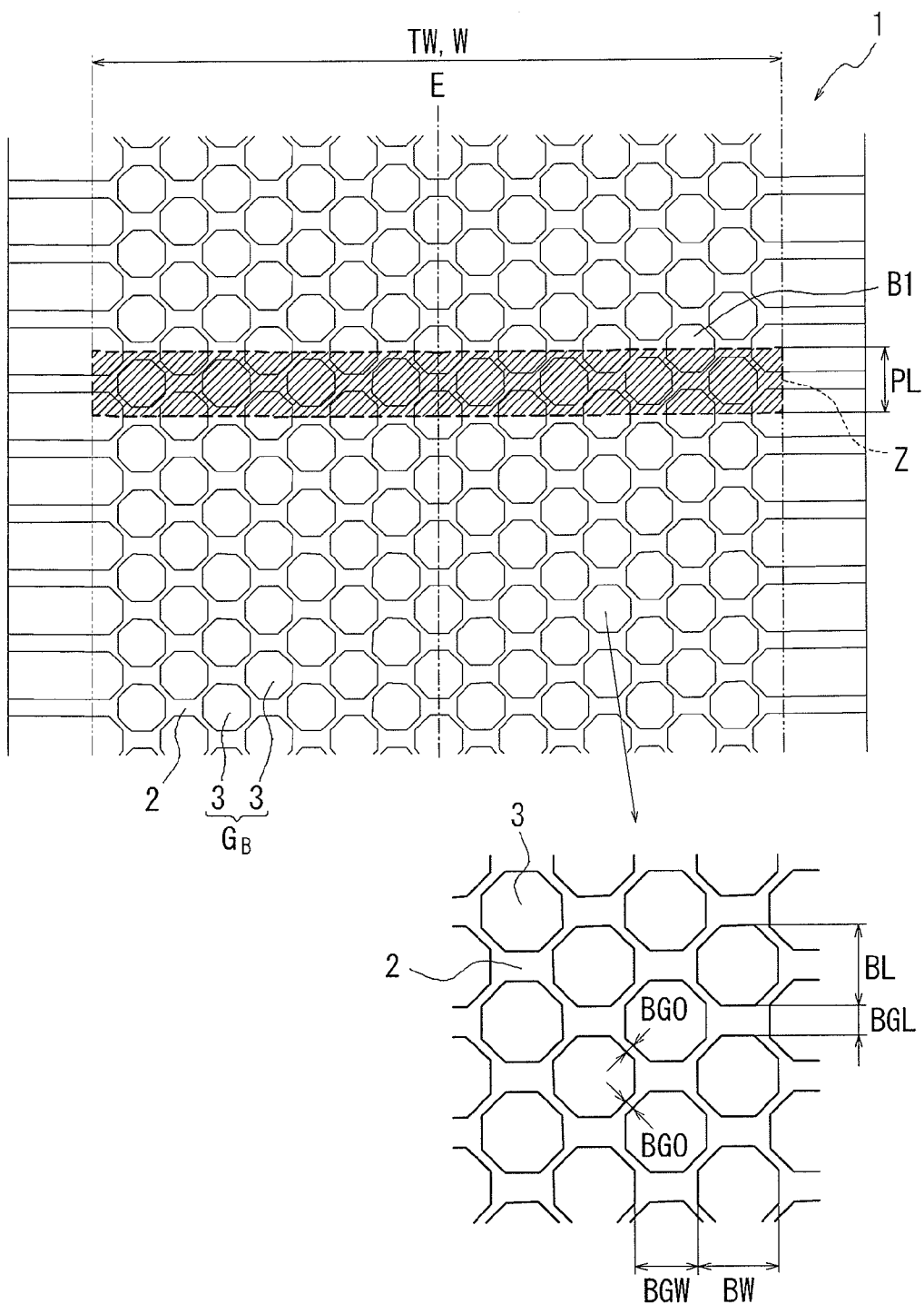
FIG. 6 is a partial development view showing a tread pattern of a comparative pneumatic tire (tire of Comparative Example 2).
Figure 7:
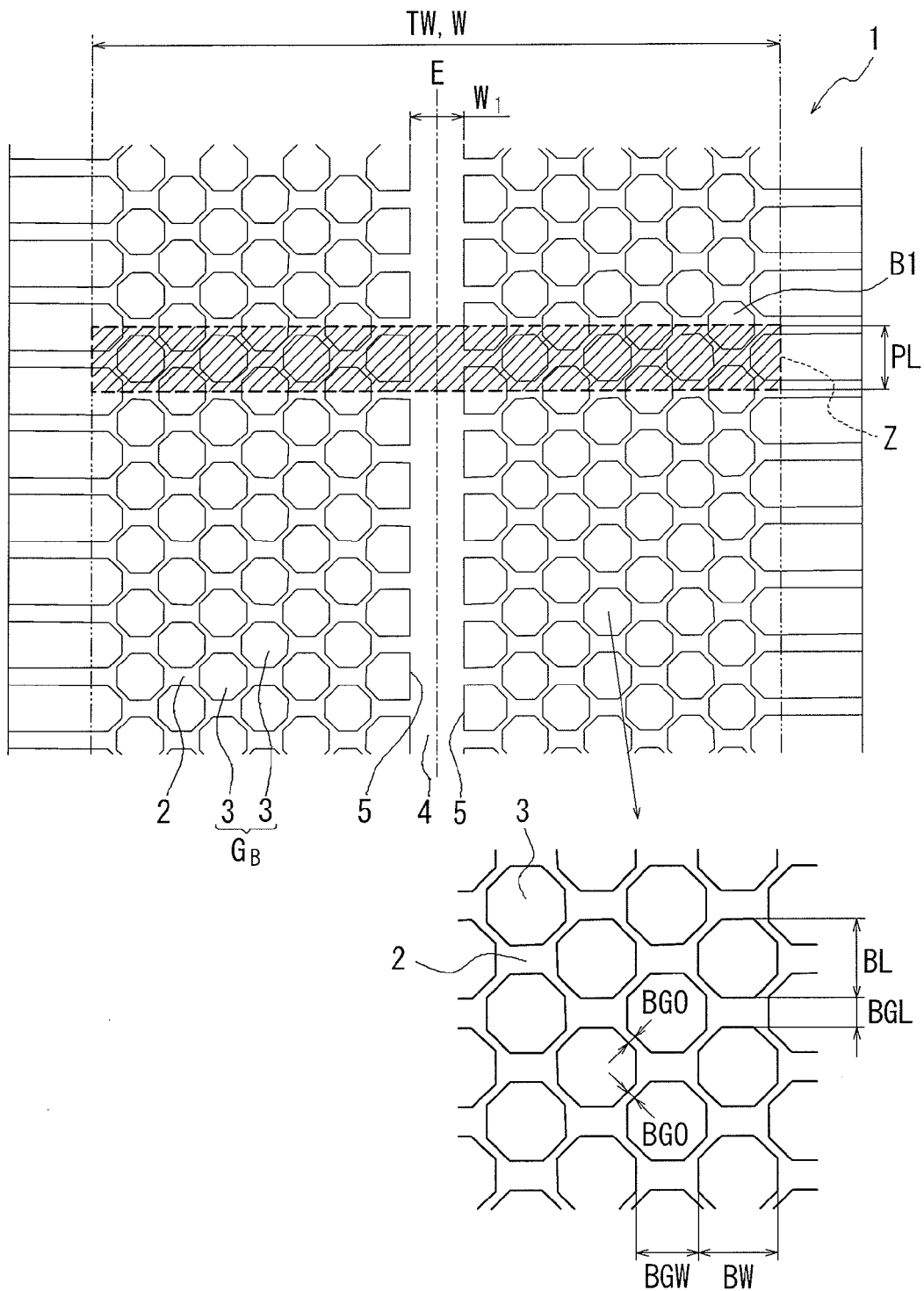
FIG. 7 is a partial development view showing a tread pattern of a comparative pneumatic tire (tire of Comparative Example 3).

For further comparison purpose, the tire of Comparative Example 2 and the tire Comparative Example 3 are also prepared, the tire Comparative Example 2 is a radial tire in 205/55R16 size and has, in the tread portion, a tread pattern shown in FIG. 6, the tire Comparative Example 3 is a radial tire in 205/55R16 size and has, in the tread portion, a tread pattern shown in FIG. 7. In the tire of Comparative Example 2, neither the circumferential main groove nor the rib-like land portion is provided in the small block group. In the tire of Comparative Example 3, the circumferential main groove is provided in the small block group, but rib-like land portion is not provided. Other specification is shown in Table 2.

mode on a test course covered by compacted snow and perform a comprehensive evaluation of braking performance, acceleration performance, straight traveling performance and cornering performance by feel. The evaluation results are shown in Table 2. Table 2 shows the results of the tires of Examples 1 to 3 and Comparative Examples 1 to 3 as index with respect to the result of the tire of Conventional Example 1 by regarding the result of the Conventional Example 1 as 100. The larger the value of each result is the better feeling on snow can be obtained.

(3) Evaluation Test on Braking Performance on Snow

Evaluation test on braking performance on snow was carried out by measuring a braking distance when full brake was applied from a speed of 40 km/h on compacted snow road. The evaluation results are shown in Table 2. Table 2 shows the results of the tires of Examples 1 to 3 and Comparative Examples 1 to 3 as index with respect to the result of the tire of Conventional Example 1 by regarding the result of the Conventional Example 1 as 100. The larger the value of each result is the better braking performance on snow can be obtained.

TABLE 1

|  | Example 1 | Example 2 | Example 3 | Conventional Example 1 | Comparative Example 1 | Comparative Example 2 | Comparative Example 3 |
|---|---|---|---|---|---|---|---|
| Tread pattern | FIG. 1 | FIG. 2 | FIG. 3 | FIG. 4 | FIG. 5 | FIG. 6 | FIG. 7 |
| Shape of small block | Regular octagon | Regular octagon | Regular octagon | Rectangle | Rectangle | Regular octagon | Regular octagon |
| Tread ground contact width TW (mm) | 190 | 190 | 190 | 190 | 190 | 190 | 190 |
| The number of circumferential main groove | 1 | 1 | 2 | — | — | — | 1 |
| The number of rib-like land portion | 2 | 2 | 2 | — | — | — | — |
| Total surface area of rib-like land portions (mm$^2$) | 174 | 170 (except sipes) | 170 (except sipes) | — | — | — | — |
| Circumferential length of small block BL (mm) | 13.5 | 13.5 | 13.5 | 28 | 13.5 | 13.5 | 13.5 |
| Widthwise length of small block BW (mm) | 13.5 | 13.5 | 13.5 | 19.7 | 9.9 | 13.5 | 13.5 |
| Distance between small blocks BGL (mm) | 4.5 | 4.5 | 4.5 | — | — | 4.5 | 4.5 |
| Distance between small blocks BGW (mm) | 9.8 | 9.8 | 9.8 | — | — | 9.8 | 9.8 |
| Distance between small blocks BGO (mm) | 1.1 | 1.1 | 1.1 | — | — | 1.1 | 1.1 |
| Height of small block (mm) | 8.5 | 8.5 | 8.5 | 8.5 | 8.5 | 8.5 | 8.5 |
| Reference pitch length PL (mm) | 18.0 | 18.0 | 18.0 | 35.9 | 18.0 | 18.0 | 18.0 |
| Negative ratio of small block group (%) | 31.0 | 31.2 (include sipes) | 36.3 (include sipes) | 31.9 | 32.6 | 27.9 | 33.0 |
| The number of small block rows (lines) | 14 | 14 | 13 | 9 | 17 | 17 | 15 |
| The number of small blocks a (piece) | 14 | 14 | 13 | 9 | 17 | 17 | 15 |
| Number density of small blocks (piece/mm$^2$) | 0.00593 | 0.00595 | 0.00597 | 0.00194 | 0.00737 | 0.0069 | 0.00655 |

[Performance Evaluation]

Each of the sample tires described above was assembled with a rim having a size of 6.5J×16 at an inner pressure of 220 kPa (relative pressure), and was mounted to a vehicle. Then, the following tests were carried out to evaluate performances thereof.

(1) Evaluation Test on Braking Performance on Ice

Evaluation test on the braking performance on ice was carried out by measuring a braking distance when full brake was applied from a speed of 20 km/h on ice road. The evaluation results are shown in Table 2. Table 2 shows the results of the tires of Examples 1 to 3 and Comparative Examples 1 to 3 as index with respect to the result of the tire of Conventional Example 1 by regarding the result of the Conventional Example 1 as 100. The larger the value of each result is the better braking performance on ice is obtained.

(2) Evaluation Test on Feeling on Snow

Evaluation test on feeling on snow was carried out by test driver's feeling when the test driver drives at various driving (4) Evaluation Test on Water Evacuation Property Evaluation test on water evacuation property was carried out by measuring a limit speed until a genesis of hydroplaning phenomenon when driving straight on wet road covered by 5 mm water. The evaluation results are shown in Table 2. Table 2 shows the results of the tires of Examples 1 to 3 and Comparative Examples 1 to 3 as index with respect to the result of the tire of Conventional Example 1 by regarding the result of the Conventional Example 1 as 100. The larger the value of each result is the better water evacuation property can be obtained.

(5) Evaluation Test on Driving Stability on Dry Road

Evaluation test on driving stability on dry road was carried out by test driver's feeling when the test driver drives at various driving mode on dry load and perform evaluation by feel. The evaluation results are shown in Table 2. Table 2 shows the results of the tires of Examples 1 to 3 and Comparative Examples 1 to 3 as index with respect to the result of the tire of Conventional Example 1 by regarding the result of the Conventional Example 1 as 100. The larger the value of each result is the better driving stability on dry road can be obtained.

(6) Evaluation Test on Anti-Uneven Wear Performance

Evaluation test on anti-uneven wear performance was carried out by measuring steps between adjacent blocks (volume of heel-and-toe wear) after driving 5000 km at various driving mode on dry load. The evaluation results are shown in Table 2. Table 2 shows the results of the tires of Examples 1 to 3 and Comparative Examples 1 to 3 as index with respect to the result of the tire of Conventional Example 1 by regarding the result of the Conventional Example 1 as 100. The larger the value of each result is the better anti-uneven wear performance can be obtained.

TABLE 2

|  | Example 1 | Example 2 | Example 3 | Conventional Example 1 | Comparative Example 1 | Comparative Example 2 | Comparative Example 3 |
| --- | --- | --- | --- | --- | --- | --- | --- |
| Braking performance on ice | 135 | 138 | 137 | 100 | 130 | 140 | 139 |
| Feeling on snow | 121 | 123 | 127 | 100 | 110 | 120 | 125 |
| Braking performance on snow | 111 | 113 | 114 | 100 | 110 | 115 | 120 |
| Water evacuation property | 116 | 116 | 118 | 100 | 97 | 96 | 114 |
| Driving stability on dry road | 114 | 112 | 110 | 100 | 95 | 108 | 105 |
| Anti-uneven wear performance | 114 | 115 | 108 | 100 | 90 | 100 | 97 |

From the evaluation results shown in Table 2, according to the present invention, further to dramatic improvements of on-ice/snow performances, water evacuation property can be improved. In addition, according to the present invention, as is clear from comparison with the Comparative Example 3, it is possible to prevent the uneven wear as well as improve the above performances. Further, as is clear from comparing the Example 3 with Example 1, by increasing the number of the circumferential main groove, the water evacuation property and on-snow performance can be more improved.

INDUSTRIAL APPLICABILITY

According to the present invention, it is possible to improve the water evacuation property while preventing uneven wear, as well as to significantly improve the on-ice/snow performances by optimizing a tread pattern.

EXPLANATION OF REFERENCE CHARACTERS

1 Tread portion
2 Groove
3 Small block
4 Circumferential main groove
5 Groove face
6 Rib-like land portion
7 Sipe
$G_B$ Small block group
PL Reference pitch length of small block group in the circumferential direction
W Width of small block group
Z Reference zone

The invention claimed is:

1. A pneumatic tire having a small block group in at least a part of a tread portion, the small block group including a plurality of small blocks arranged close together, the small blocks being independently defined by grooves and queuing up a plurality of block rows extending in a tread circumferential direction, comprising:
   at least one circumferential main groove positioned in the small block group, the circumferential main groove including see-through groove portion, the see-through groove portion linearly extending in the tread circumferential direction;
   at least one rib-like land portion provided adjacently to the circumferential main groove, the rib-like portion forming a groove side face of the circumferential main groove and continuously extending in the circumferential direction; and
   a number density D of the small blocks is set within a range of 0.003 to 0.04 (pieces/mm$^2$), the number density D representing the number of the small blocks per unit of an actual ground contact area of the small block group and obtained by a formula: $D=a/\{PL \times W \times (1-N/100)-S\}$,
   wherein PL (mm) represents a reference pitch length of the small blocks in the small block group, W (mm) represents a width of small the block group, a (pieces) represents the number of the small blocks existing in a reference zone of the small block group, the reference zone is demarcated by the reference pitch length PL and the width W, N (%) represents a negative ratio in the reference zone, and S (mm$^2$) represents a surface area of the rib-like land portion existing in the reference zone, and
   wherein a distance between adjacent small blocks (BGL) in the tread circumferential direction is larger than a distance between adjacent small blocks (BGO) in an oblique direction with respect to the tread circumferential direction.

2. The pneumatic tire according to claim 1, wherein the rib-like land portion has narrow grooves, the narrow grooves close when the rib-like land portion contacts the ground.

3. The pneumatic tire according to claim 2, wherein widths of the narrow grooves are within a range of 0.2 mm to 2.0 mm.

4. The pneumatic tire according to claim 1, wherein a side wall of the rib-like land portion adjacent to the circumferential main groove linearly extends in the tread circumferential direction.

5. The pneumatic tire according to claim 2, wherein a side wall of the rib-like land portion adjacent to the circumferential main groove linearly extends in the tread circumferential direction.

6. The pneumatic tire according to claim 3, wherein a side wall of the rib-like land portion adjacent to the circumferential main groove linearly extends in the tread circumferential direction.

* * * * *